US008850741B2

(12) United States Patent
Hickman (10) Patent No.: US 8,850,741 B2
(45) Date of Patent: Oct. 7, 2014

(54) DEVICE FOR CONTROLLING PESTS

(75) Inventor: Robert B. Hickman, Maitland, FL (US)

(73) Assignee: BASF SE, Ludwigshafen (DE)

( * ) Notice: Subject to any disclaimer, the term of this patent is extended or adjusted under 35 U.S.C. 154(b) by 280 days.

(21) Appl. No.: 12/935,729

(22) PCT Filed: Apr. 3, 2009

(86) PCT No.: PCT/EP2009/054047
§ 371 (c)(1),
(2), (4) Date: Oct. 26, 2010

(87) PCT Pub. No.: WO2009/121968
PCT Pub. Date: Oct. 8, 2009

(65) Prior Publication Data
US 2011/0030268 A1    Feb. 10, 2011

Related U.S. Application Data

(60) Provisional application No. 61/042,435, filed on Apr. 4, 2008.

(51) Int. Cl.
*A01M 1/20*     (2006.01)

(52) U.S. Cl.
CPC .................... *A01M 1/2011* (2013.01)
USPC .......................................... 43/131

(58) Field of Classification Search
USPC ................. 43/107, 121, 131, 132.1
See application file for complete search history.

(56) References Cited

U.S. PATENT DOCUMENTS

| 1,572,098 | A | * | 2/1926 | Wiggins ......................... 43/131 |
| 1,573,278 | A | * | 2/1926 | Schlesinger ................... 43/131 |
| 2,004,121 | A | * | 6/1935 | Loibl, Jr. ........................ 43/131 |
| 2,060,245 | A | * | 11/1936 | Rosefield ....................... 43/131 |
| 2,098,027 | A | * | 11/1937 | Boyd et al. .................... 43/121 |
| 2,328,590 | A |   | 9/1943 | Weil |
| 4,132,026 | A |   | 1/1979 | Dodds |
| 4,310,985 | A | * | 1/1982 | Foster et al. ................... 43/131 |
| 4,349,981 | A |   | 9/1982 | Sherman |

(Continued)

FOREIGN PATENT DOCUMENTS

| EP | 0378431 | 7/1990 |
| FR | 2599591 | 12/1987 |

(Continued)

OTHER PUBLICATIONS

International Search Report for International Application No. PCT/EP2009/054047.

(Continued)

*Primary Examiner* — Peter M. Poon
*Assistant Examiner* — Danielle Clerkley
(74) *Attorney, Agent, or Firm* — Brinks Gilson & Lione (57) ABSTRACT

The invention relates to an apparatus for pest control comprising a hollow station (150) forming at least one entrance (160, 165) for the pests to be controlled and a harborage area inside the station; a reservoir for water (100) providing access to water from the inside of said hollow station (150); and a contact pesticide (170) for the pests to be controlled, said contact pesticide (170) being provided inside said hollow station (150) in such a way that pests which enter the hollow station (150) through said at least one entrance (160, 165) to come to the reservoir for water (100) or the harborage area come into contact with said contact pesticide (170).

20 Claims, 3 Drawing Sheets

(56) References Cited

U.S. PATENT DOCUMENTS

| | | | |
|---|---|---|---|
| 4,400,904 A | 8/1983 | Baker | |
| 4,400,905 A | 8/1983 | Brown | |
| 4,608,774 A | 9/1986 | Sherman | |
| 4,709,504 A * | 12/1987 | Andric | 43/114 |
| 4,753,032 A | 6/1988 | Sherman | |
| 4,807,391 A * | 2/1989 | Bokiau | 43/131 |
| 4,819,371 A * | 4/1989 | Cohen | 43/131 |
| 4,823,506 A * | 4/1989 | Demarest et al. | 43/131 |
| 4,908,980 A | 3/1990 | Sherman | |
| 4,970,822 A | 11/1990 | Sherman | |
| 4,977,701 A | 12/1990 | Sherman | |
| 5,033,229 A * | 7/1991 | Demarest et al. | 43/131 |
| 5,501,033 A * | 3/1996 | Wefler | 43/131 |
| 5,930,944 A * | 8/1999 | Knuppel | 43/114 |
| 5,943,816 A * | 8/1999 | Hyatt et al. | 43/131 |
| 6,553,712 B1 * | 4/2003 | Majerowski et al. | 43/131 |
| 6,584,728 B2 * | 7/2003 | Aesch et al. | 43/132.1 |
| 6,588,141 B1 * | 7/2003 | Bergeson | 43/131 |
| 6,606,816 B2 | 8/2003 | Oi et al. | |
| 6,606,817 B2 * | 8/2003 | Oi et al. | 43/131 |
| 6,920,716 B2 * | 7/2005 | Kollars et al. | 43/114 |
| 2002/0069579 A1 * | 6/2002 | Hyatt et al. | 43/131 |
| 2010/0031556 A1 * | 2/2010 | Kupfer et al. | 43/131 |

FOREIGN PATENT DOCUMENTS

| | | |
|---|---|---|
| JP | 59-118765 | 2/1986 |
| JP | 02-088503 | 3/1990 |
| JP | 63-148637 | 5/1990 |
| JP | 09-322685 | 12/1997 |
| JP | 2000-500345 | 1/2000 |
| JP | 2002-253100 | 9/2002 |
| JP | 2007-533680 | 11/2007 |
| WO | WO 97/18704 | 5/1997 |
| WO | WO 00/19816 | 4/2000 |
| WO | WO 01/01770 | 1/2001 |
| WO | WO 2005/102054 | 11/2005 |

OTHER PUBLICATIONS

International Preliminary Report on Patentability for International Application No. PCT/EP2009/054047.

Silverman et al., "Behavioral resistance of field-collected German cockroaches (blattodea: blattellidae) to baits containing gluclose", Environm. Entomol, 23:2, 425-430 (1994).

Silverman et al., "Glucose aversion in the German cockroach, *Blattella germanica*", J. Insect. Physiol., 39:11, 925-933 (1993).

* cited by examiner

DEVICE FOR CONTROLLING PESTS

This application is a National Stage application of International Application No. PCT/EP2009/054047 filed Apr. 3, 2009, which claims the benefit of U.S. Provisional Application No. 61/042,435, filed Apr. 4, 2008, the entire contents of which are hereby incorporated herein by reference.

The present invention relates to an apparatus for pest control, and to the use of said apparatus for pest control.

Pests, in particular arthropods among which insects are predominant, are uninvited guests at many human activities. Insect pests can be classified according to one of two groups based on their situation: agricultural pests or household pests. Whereas the former cause heavy economic damage and pose a potential threat to food and fibre crops, the latter are particularly unpleasant due to the possibility of direct contact with human beings.

Household pests may be divided into parasites such as fleas, lice, bedbugs, etc., which directly feed on the human body, and commensals such as cockroaches, termites, silverfish, firebrats, etc., which merely thrive in human habitations due to advantageous conditions of temperature, moisture, presence of food, etc. Apart from being aesthetically undesirable (which is of economic importance in public places such as inns, hotels, etc., where the presence of pests is generally considered as low standard), such commensals are apt to cause damage to human food, chattels and buildings, to compromise hygiene by gratuitous dropping of faeces, exuviae etc., and to aid in the spread of potentially harmful microorganisms.

More recently, household pests and their wastes have also been implicated as potential allergens. E. g., a 2005 U.S. national study on factors that affect asthma in inner-city children, funded by the U.S. National Institute of Environmental Health Sciences (NIEHS) and the U.S. National Institute of Allergy and Infectious Diseases (NIAID), shows that cockroach allergens appear to significantly worsen asthma symptoms.

Control of pests, in particular household pests, must take into account the continuing presence of humans (and pets), foodstuffs or agricultural products and chattels in the affected areas. In particular, technological items such as electrically operated devices tend to be incompatible with common countermeasures such as spraying. Thus, extensive spraying with agricultural pesticides is generally not acceptable for the control of household pests. Moreover, for psychological reasons it is desirable to proceed in as "discreet" a fashion as possible; as mentioned before, the mere presence of household pests, as betrayed by too obvious control measures, may be sufficient to tarnish the reputation of a public place.

Another approach consists of the spreading of food particles containing toxins, to which the pests are attracted. It is common practice to use baited traps for household pest control, which contain an attractant such as a small amount of food to lure the target pest into contact with a low-dosage pesticide.

A very popular embodiment of such a baited trap is the Roach Motel™ by Black Flag, based on the "roach run" of U.S. Pat. No. 2,328,590 (1943), wherein food is used to lure cockroaches into a compartment in which they are trapped by a sticky substance ("roaches check in but do not check out"). U.S. Pat. No. 4,608,774 discloses another baited cockroach trap design which is based on the funnel principle. U.S. Pat. No. 4,400,905 teaches the design of a "decorative" cockroach trap with a toxic insert and an outside "concealing the true purpose of the roach trap".

A baited trap for rodents wherein the target pest is locked out from direct access to the bait is disclosed in U.S. Pat. No. 4,400,904 (1983).

Apart from its general lack of net efficiency towards socially organized pests such as ants, there are two major disadvantages to the baited trap approach.

First, successful trapping of pests may quickly fill up the trap with their dead bodies, thereby rendering it unusable, while at the same time socially organized pests suffer only very limited damage from elimination of their disposable workers, which are easily replaced by the colony. However, even when no clogging of the trap occurs, the food source may fail by being degraded or consumed, thereby terminating the usefulness of the trapping device.

Second, and more importantly, many pests, in particular household pests, are capable of developing avoidance behaviours to novel elements in their environment. In many arthropod pests, high reproduction rates, short generation times and general adaptability combine to readily produce mutants with an aversion to baits. E. g., in cockroaches the development of "behavioural resistance" to glucose baits was demonstrated (Silverman J. & Bieman D. N., J. Insect Physiol. 39: 925-933 (1993); and Silverman J. & Ross M. H., Environm. Entomol. 23: 425-430 (1994)). It is assumed that within every pest population there will be a few mutants with a natural aversion to the food used as bait. Under normal conditions these are at disadvantage due to restricted food utilization but will thrive when their normal mates are decimated by the application of food baits. It should be kept in mind that a key factor to being a successful household pest is the ability to exploit a wide variety of foods, so aversion to individual components still leaves a wide spectrum of readily exploitable nutrient sources. Thus, both the baited trap approach and the spreading of toxic baits are apt to lose efficacy against household pests over time.

It is thus beneficial to use a non-bait attractant which the target pests are unlikely to develop aversion to. Pheromones have been used to some success. This approach is not only expensive to manufacture but may lead to instability during prolonged storage due to the evaporation and/or chemical decay of the pheromone.

For rodent pests, contact poison delivery devices without bait or other attractants are available, e. g. as disclosed in U.S. Pat. Nos. 4,132,026, 4,349,981 and 4,753,032. The efficacy of these devices, usually in the overall shape of a pipe or tube, is linked to their placement in the runways of the rodent pests, whereby the rodents will readily pass through the device and come into contact with the poison.

U.S. Pat. Nos. 4,908,980 and 4,977,701 disclose traps for flying insects such as house flies which exploit the general lack of long-range orientation in arthropods. Both are based on the house flies being strongly attracted to light. This approach is unsuitable for many pests, in particular household pests, which are successful partly by virtue of their being photophobic, causing them to seek dark places and thereby enabling them to stay hidden from direct visual detection.

U.S. Pat. No. 4,970,822 (1990) discloses a cockroach trap which may operate without any bait, attracting cockroaches solely by offering refuge and killing them by the presence of contact insecticide. However, cockroach control is limited as harbourage alone is not a particularly strong attractant.

It is thus an object of the present invention to provide an apparatus for efficiently and discreetly controlling pests, in particular household pests, preferably on a nonspecific basis.

Surprisingly, it was found that it is possible to lure, with efficacy, pests such as household pests to an area comprising a contact toxin by providing, in spatial conjunction with the toxin, water and harbourage. These two factors are highly unlikely to allow for the development of behavioural avoidances mechanisms. After acquisition of an effective dose of the toxin, the pests still have sufficient time to leave the apparatus providing water, harbourage and the toxin, and to contaminate, during their normal social interactions, other members of their species with the toxin. This will spread the effect also to individuals which have not entered said apparatus and effectively multiply the control effect ("cascade effect"). Many pests, in particular social insects, indulge in necrophagy (feeding on dead bodies of the same species) and/or trophallaxis (mutual feeding), whereby the pesticide effect is quickly circulated among the population.

Thus, the underlying problem is solved by an apparatus comprising the features of claim 1 and its use. Particular embodiments of the invention are as described in the dependent claims.

The present invention thus relates to an apparatus for pest control, comprising a hollow station forming at least one entrance for the pests to be controlled and a harbourage area inside the station; a reservoir for water providing access to water from the inside of said hollow station; and a contact pesticide for the pests to be controlled, said contact pesticide being provided inside said hollow station in such a way that pests which enter the hollow station through said at least one entrance to come to seek harbourage or water from the reservoir, come into contact with said contact pesticide.

As used herein, the term "pest" is used to denote any animal macroorganism which is undesirable in human dwelling places, especially an animal macroorganism that is capable of establishing stable and self-sustaining populations in permanent human dwelling places. Pests may essentially belong to any taxon within the animal kingdom but will generally be invertebrates, preferably arthropods, e.g. uniramians such as insects, among which heteropteroids (bugs), hymenopterans (ant) and in particular blattoids (cockroaches and termites) are particularly preferred. The skilled artisan will understand that with regard to pests whose life cycle comprises more than one developmental stage, the present invention is directed preferably to those stages exhibiting more active locomotion, e.g. larvae, nymphs and imagines.

As used herein, the term "harbourage" is used to denote any area of shelter which the target pests actively seek for resting. The skilled person is aware that many important pests, in particular household pests such as most blattoids are photophobic and also thigmotactic, i.e. they show "hiding" behaviour by fleeing from light and actively seeking covered places.

As used herein, the term "contact pesticide" is used to denote any agent or mixture or formulation of agents that upon contact exerts a damaging influence on a pest as defined hereinbefore, wherein the term "damage" is understood to be any effect that kills or disables the target pest or significantly interferes with its activities such as its feeding and/or reproduction, preferably kills the pest, without the need for active uptake (ingestion) by the target pest.

Basically, contact pesticides may be of any nature, including biological agents such as bacteria, viruses and fungi specific for the target pests, but chemical pesticides are most preferred. Appropriate chemical contact pesticides useful in the invention include, without being limited to the following:

Fipronil and chlorfenapyr that are especially suitable for efficiently combating ants, bedbugs, beetles, centipedes, cockroaches, crickets, earwigs, pillbugs, scorpions, silverfish and spiders; metaflumizone that is especially suitable for efficiently combating ants; and alpha-cypermethrin that is especially suitable for efficiently combating ants, cockroaches, silverfish and spiders. It is mentioned that, although alpha-cypermethrin is considered a repellent active, it has been shown to be non-repellent under certain situations and with certain pests, so that it may be used in connection with the present invention.

Furthermore, imidicloprid may be used for ants; acetamiprid for ants, beetles, centipedes, cockroaches, crickets, earwigs, pillbugs, scorpions, silverfish, and spiders; thiamethoxam for ants, beetles, centipedes, crickets, earwigs, pillbugs, and silverfish; and indoxacarb for ants and cockroaches.

The apparatus of the invention does not allow for the development of behavioural avoidance mechanisms. Furthermore, it does not allow a trapping device or other apparatus to be rendered unusable by the accumulated bodies of dead pests. It also offers the possibility of controlling socially organized pests.

In another preferred embodiment, the apparatus of the invention does not comprise an edible attractant.

As used herein, the term "edible attractant" is used to denote any substance which is capable of being identified as a nutrient source by the target pests, independent of whether this is genuine food or not.

Absent are any identifiable properties that would be conducive to the formation of aversion behaviour by the target pest population, i.e., the present invention eschews the use of an attractant which can be developed into a warning sign by populations through natural selection. In this embodiment, the target pests are attracted merely by harbourage and water, both of which are fundamental organic needs for which, in contrast to any particular foodstuff, no substitute or equivalent can be readily found. Hence target pest populations can be expected to be incapable of developing an aversion towards them. For socially organized pests in particular, whose reproductive individuals most markedly depend on controlled living space and trophallaxis, developing such an aversion would be intrinsically fatal.

In a preferred embodiment of the invention, the pesticide-containing matrix is essentially the interior surface of the harbourage section.

In a further preferred embodiment of the invention, the pesticide-containing matrix recedes at the entrance or entrances of the hollow station, thereby minimizing the risk of inadvertent contact during handling of the apparatus and also of contamination during accidental contact (e. g. with children or pets).

In a further embodiment of the invention, the pesticide is sprayed on at least certain surfaces of the inside walls of the hollow station. Furthermore, a foam might by used to apply the pesticide. The foam may for example be attached to the inside of the hollow station.

In a further embodiment of the invention, the pesticide is added to the water in the reservoir.

In a further embodiment of the invention, the apparatus comprises a device for delivering the pesticide inside the hollow station. Such device is adapted to deliver the pesticide when pests enter the hollow station through an entrance to come to the reservoir for water or the harbourage area. Advantageously, such a device may be recharged with the pesticide in the field. For such a recharging the device is provided with an opening that is accessible from outside.

In a particularly preferred embodiment, the reservoir for water comprises a container for accommodating water, said container comprising at least one opening which is connected to at least one opening of said hollow station. It is even more preferred that the opening or the openings of said container are aligned to the opening or the openings of said hollow station.

Preferably, the reservoir is directly connected to the harbourage section. In a particular embodiment, water contained in the reservoir is made accessible from the harbourage area via at least one hole connecting the reservoir and the harbourage area. In a preferred embodiment of the invention, the reservoir for water comprises an absorbent plug, which preferably utilizes super absorbent polymers. This plug and the water contained therein preferably do not comprise the pesticide. Even more preferably, the opening or the openings of said housing and the opening or the openings of said hollow station are plugged by an absorbent material, e. g. so that a surface of said absorbent plug is flush with an interior wall of said hollow station. Without wishing to be bound by theory, it is assumed that this does not impede free movement of the pests within the harbourage area and thus increases the appeal of the harbourage offered. Preferably, it permits the harbourage area or a portion thereof to remain moist over extended periods of time without allowing free flow of water into the harbourage area, thereby preventing the drying up of the reservoir and the flooding of the harbourage area which would render it largely inhospitable to many pests, such as most common household pests.

In a particularly preferred embodiment of the invention, the container is arranged above said hollow station. Even more preferably, it comprises a valve for recharging with water. Preferably, the reservoir for water can be recharged with water without dismantling the apparatus. As the apparatus is not intended to trap pests and does not comprise any unstable compounds, this allows operation of the apparatus over a theoretically unlimited time.

In a particular embodiment of the invention, the apparatus comprises a means for fixing, such as an adhesive strip, on its external surface. In a further particular embodiment of the invention, the outside of the apparatus may be appropriately decorated, e.g. "camouflaged" for its intended environment. In a most particular embodiment of the invention, the outside of the apparatus mimics a technological item of comparable size, such as a computer network hub.

In a particular embodiment of the invention, the hollow station of the apparatus comprises two entrances for the pests to be controlled arranged on opposite sides of the harbourage area.

In a particular embodiment of the invention, the apparatus comprises translucent sections for inspection of the harbourage area and/or the reservoir section from the outside. When the reservoir section comprises a translucent section, expediently it will be arranged in such a way that it allows inspection of the container.

It is preferred that the translucent sections which the hollow station comprises are coloured in red, orange or yellow, more preferably red. Without wishing to be bound by theory, the rationale for this choice is that many pests, in particular such as have a strong requirement for harbourage, are photophobic but react only weakly to longer-wavelength illumination. Thus, they will still accept the harbourage area provided by the apparatus while at the same time it is easy to inspect the apparatus with minimal disturbance.

It is further preferred that the translucent sections which the reservoir section comprises are coloured in a shade of blue. Without wishing to be bound by theory, it is assumed that blue is the colour generally associated with water and will therefore be helpful in the proper handling of the apparatus; moreover, blue is often perceived as subjectively suggesting cleanliness. As light protection is not critical, and a low amount of dye increases transparency, pale blue is most preferred.

It is to be understood that the translucent sections may comprise most, essentially all or all of the respective section. Thus, in a particular embodiment of the apparatus of the invention, both parts of the apparatus are made of acrylic glass, wherein the material used for the harbourage area comprises a red dye and the material used for the reservoir section a blue dye.

In a most preferred embodiment of the invention, the contact toxin is fipronil or a derivative thereof, preferably fipronil.

The overall design of the apparatus may be adapted in terms of shape, size, colour, etc., according to a wide range of requirements, all of which are within the scope of the invention as long as they are characterized by comprising the aforementioned features. In an exemplary embodiment, the apparatus may be essentially rectangular, oblong, circular, tubular or of any other regular or irregular shape that is appropriate under the intended conditions of use, which are easily determined by the skilled artisan. In particular, the design of the outside of the apparatus may be selected from a wide variety of shapes and colours, or combinations thereof, and may also include elements for decoration or camouflage within the intended environment so not to attract undesirable attention. In general, it is preferred that the apparatus is made of durable materials such as hard plastics which allow long-term use and facilitate recharging and cleaning if desired; and that its design endows it with sufficient mechanical stability to prevent accidental damage, puncture or crushing which could lead to uncontrolled release of the pesticide contained therein.

It is particularly preferred that the nature and availability of the contact pesticide within the apparatus are selected, by means of choosing suitable dosages and dispensers and other means which the skilled person is familiar with, so that during the expected visit of a target pest to the apparatus it is exposed to a dosage of the pesticide that is sufficient for doing the intended damage as defined above but insufficient to disable or kill the pest while still within the apparatus. Suitable parameters are easily selected by the skilled person, e. g. by observing the actual behaviour of exemplary pests when the apparatus of the invention is provided.

Using such "slow killing" parameters, the apparatus will remain mostly free of dead pests, as there will be ample time for the target pests to leave the apparatus in the course of their normal behaviour, even more so as certain important pests, e.g. cockroaches, were observed to exhibit flight behaviour (panicking) upon onset of the pesticide effects. Moreover, pests tainted with a sufficient amount of the contact pesticide have been observed to be capable of transferring significant amounts of the contact pesticide to other members of their species, resulting in a "resonance" or "cascade" effect among the population which extends the pesticide effects to pest individuals which have not been in contact with the apparatus. This makes the apparatus of the invention also suitable for socially organized pests such as ants, as it will eventually result in the death of the reproductive animals, thereby eradicating entire colonies. It is to be understood that even though the expression "cascade effect of mortality" is generally used to denote this effect and killing is the most preferred effect, any kind of damage as defined above, i.e. any effect that kills or disables the target pest or significantly interferes with its activities such as its feeding and/or reproduction, may be passed from pest to pest in such a cascade.

In a particular embodiment, the hollow station comprises a harbourage area section and a separate water reservoir section, both of which take the form of a rectangular tube of hard plastic. The harbourage section, which forms the lower portion of the apparatus when assembled, is open at both ends, and its interior surfaces, or parts thereof, are coated with a contact pesticide preparation, whereas the water reservoir section, which is to be mounted on top of the harbourage section, is sealed except for a tap for refilling. The two sections comprise single holes at corresponding locations in the ceiling of the harbourage section and the floor of the water reservoir section, preferably in the middle of the two sections, which can be superimposed on each other. In the water reservoir section, this hole is stuffed with the absorbent plug.

According to another aspect, the present invention relates to the use of the apparatus of the invention for pest control, in particular wherein the pests to be controlled are household pests, e. g. blattoid pests, such as pests belonging to a genus selected from the group consisting of *Blatta*, *Blattella* and *Periplaneta*; or other socially organized insect pests, such as ants. In a particular embodiment of the invention, the design of the apparatus is adapted to the size and behaviour of the preferred target. Parameters to be varied for adapting comprise, without being limited to, overall size, ceiling height, size of access openings, width and depth of harbourage area, surface structure (rough or smooth), and presence or absence of translucent areas. Suitable parameters are readily determined by the person skilled in the art.

Furthermore, the nature and availability of the contact pesticide are selected so that during the expected stay of a target pest within the apparatus said pest is exposed to a dosage of the pesticide that is sufficient for doing the intended damage, in particular for causing delayed mortality, but insufficient to kill the pest while still within the apparatus.

Furthermore, it is possible that the apparatus is recharged with a pesticide in the field to prolong the use of the apparatus in the field. If, for example, a device is provided for delivering the pesticide inside the hollow station, such device may be recharged if exhausted. If the pesticide has been added to the water in the reservoir, the pesticide may again be added together with the water in the field if the water with the pesticide is exhausted.

Additionally, the use of the apparatus in the field may be prolonged if water is recharged independent of whether the pesticide has or has not been added to the water.

Preferably, the apparatus of the invention is used as a part of an integrated pest management scheme, wherein different approaches to pest control are combined, such as surface spraying where applicable and general measures to render inhospitable the normal environment of the pests, including but not limited to improved general hygiene, architectural restructuring, etc. The skilled person will appreciate that under the stress of combined control measures many pests will develop an increased inclination to seek harbourage and thus become more apt to be exposed to the pesticide in the apparatus of the invention. Likewise, the drying up of water sources in an infested place will increase the pests' need for additional water and also make them more attracted to the water supply of the apparatus of the invention.

EXAMPLE 1

Preferred Embodiment of the Invention

Figure 1:
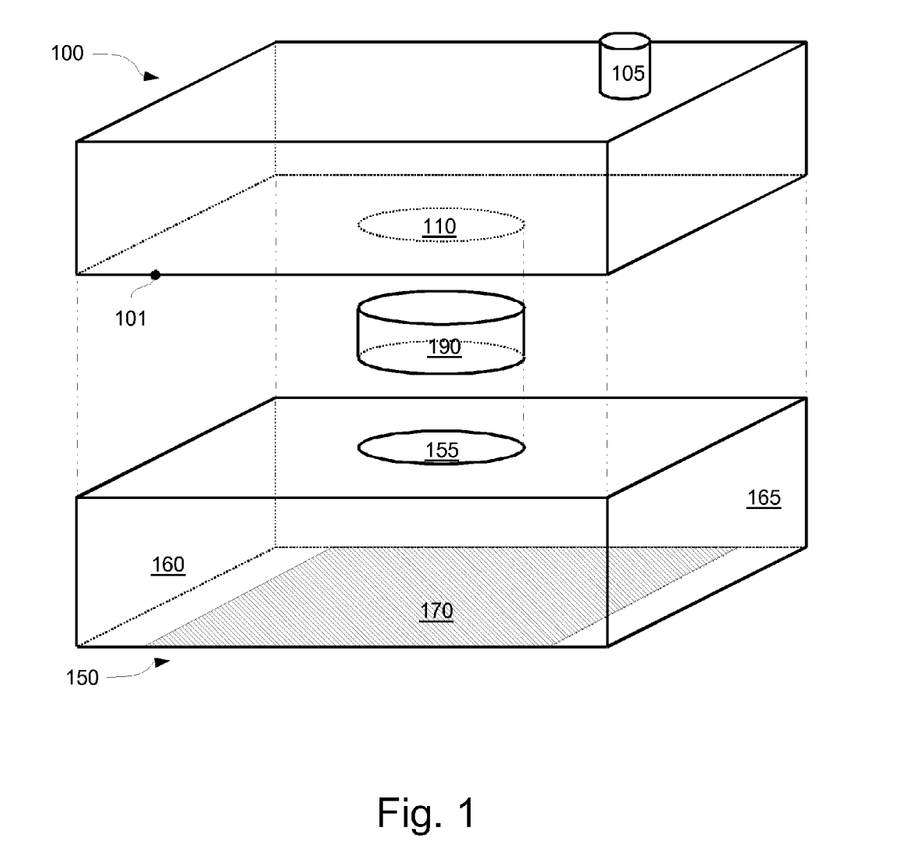
FIG. 1 schematically depicts an exploded view of an embodiment of the apparatus of the invention before assembly.

In FIG. 1, an exemplary embodiment of the invention is shown which is preferentially directed to the control of German cockroaches (*Blattella germanica*) using fipronil as contact insecticide.

In this embodiment, the apparatus comprises a water reservoir 100 including a container 101 for accommodating water, an absorbent plug 190 and a hollow station 150 forming a harbourage area including a fipronil-containing matrix. The water reservoir 100 and the hollow station 150 can be manufactured and stored separately. Expediently, they are made from hard plastic such as high-density polyethylene and sold and shipped in corresponding pairs, and the corresponding parts of the water reservoir 100 and the hollow station 150 form negative images of each other and may optionally be endowed with a glue or adhesive strip to stabilize the structure after assembly. It will be understood that their base areas are thus essentially equal. In particular, the base of the water reservoir 100 and the top of the hollow station 150, upon which the reservoir 100 will be mounted, will be equal in size and essentially mirror images of each other.

The hollow station 150, which forms the lower portion of the assembled apparatus, is in the form of an oblong with the narrow sides 160, 165 open at both ends. Thus, from a pest's perspective the harbourage area has the overall form of a tunnel with an entrance at each end. Its length from open narrow side 160 to open narrow side 165 is from approximately 4" to 12" (10 cm to 30 cm), its inner width amounts to approximately ½" (1.3 cm) and its inner height from floor to ceiling to approximately ¼" (0.6 cm).

The reservoir 100 will have a length and width equivalent and a height essentially similar to that of the hollow station 150, resulting in a capacity of 60-300 ml. It is equipped with an inlet 105, which serves for refilling the water content in the reservoir 100 (or emptying it if so desired, e. g. for mothballing the apparatus) and may be closed using a valve in order to prevent evaporation or spilling in the case of shaking and will also prevent pests from accessing the water by any other route than through the harbourage area.

Figure 2:
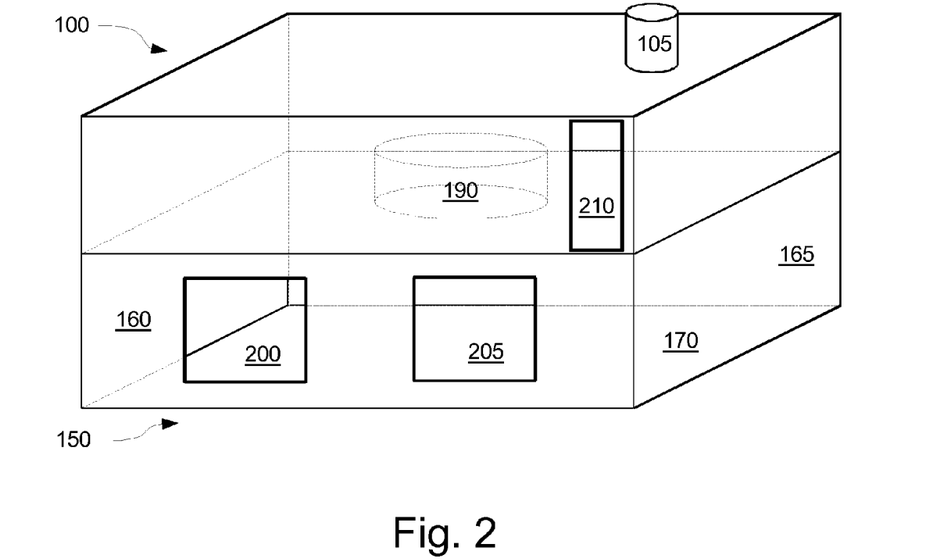
FIG. 2 shows the same perspective after assembly of the apparatus.

A hole 110 in the floor of the container 101 of the reservoir 100 corresponds to a hole 155 in the ceiling of the harbourage area of the hollow station 150 so that after assembly of the apparatus a two-chamber structure will be formed wherein the two chambers are connected by the mutually aligned holes 110 and 155 (see FIG. 2).

The floor hole 110 holds the absorbent plug 190 which extends into the water area and protrudes no further than the thickness of the harbourage area ceiling so that after assembly of the apparatus it is flush with the interior surface of the harbourage area. The absorbent plug 190 comprises high-molecular weight sodium polyacrylate (Waterlock™).

The absorbent plug 190 can be fixed in the floor hole 110 of the container 101 of the reservoir 100 mechanically, by gluing, or any other method or combination of methods suitable for creating a water-tight linkage. Thus, the surface of the plug flush with the interior wall of the harbourage area remains moist but does not permit free flow of water from the reservoir into the harbourage area of the hollow station 150, and hence the harbourage area will stay dry with the exception of the surface of the plug 190.

The insides of the harbourage area are clad with a fipronil-containing matrix 170 in such a fashion that a safety margin of approximately 1" (2.5 cm) from the entrances 160 and 165 is not covered, thereby avoiding the risk of contamination during handling and also eliminating the danger of ingestion of toxic material for children or pets showing explorative behaviour.

Figure 3:
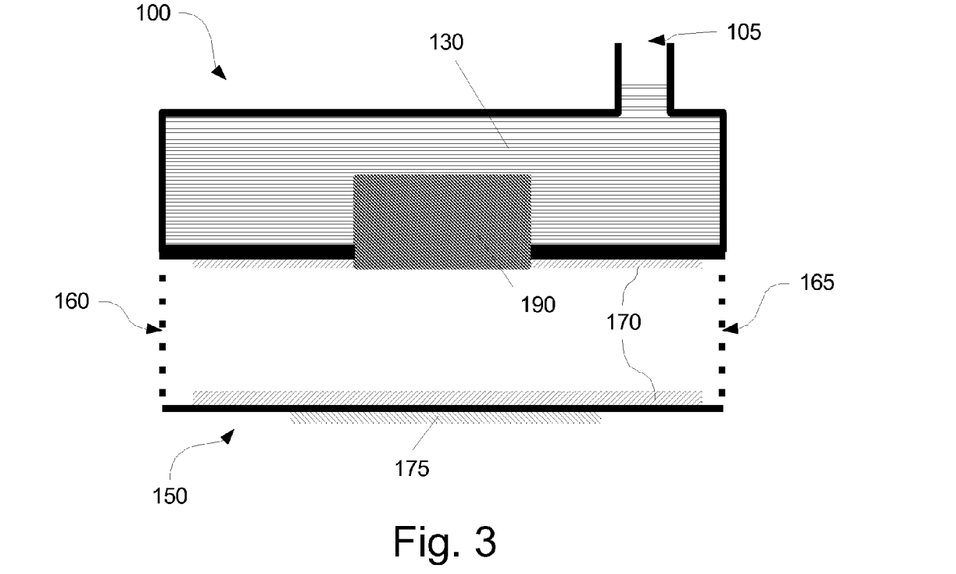
FIG. 3 shows a cross-section through the assembled apparatus of FIG. 2.

The embodiment further comprises two translucent areas and an adhesive strip as a means for fixing which are shown in FIGS. 2 and 3, respectively.

FIG. 2 shows the apparatus of FIG. 1 in its assembled condition, with the holes 110 and 155 of FIG. 1 aligned and hence locked by the absorbent plug 190. In this figure, the translucent areas 200 and 205 are shown which have been omitted in FIG. 1 in the interest of clarity. These translucent areas are made of acrylic glass dyed red and fitted into the notches of the harbourage section mechanically and/or by gluing. Furthermore, the translucent area 210 is shown which has been omitted in FIG. 1 in the interest of clarity. This translucent area is 210 made of acrylic glass dyed blue and fitted into the notches of the reservoir 100 mechanically and/or by gluing.

FIG. 3 shows a longitudinal section through the assembled apparatus of FIG. 2. In this figure, the adhesive strip 175 as a means for fixing is shown which has been omitted in FIG. 1 in the interest of clarity.

It is mentioned that, although, in the embodiment described above, the pesticide is provided inside of the harbourage area by means of a matrix, it is also possible to spray the pesticide on the inside walls of the hollow station 150. Furthermore, a foam containing the pesticide may be attached to the inside walls of the hollow station 150. Furthermore, a device for delivering the pesticide to the inside of the hollow station may be provided. Finally, the pesticide may be added to the water in the reservoir 100.

EXAMPLE 2

Attraction of Cockroaches by Harbourages

Figure 4:
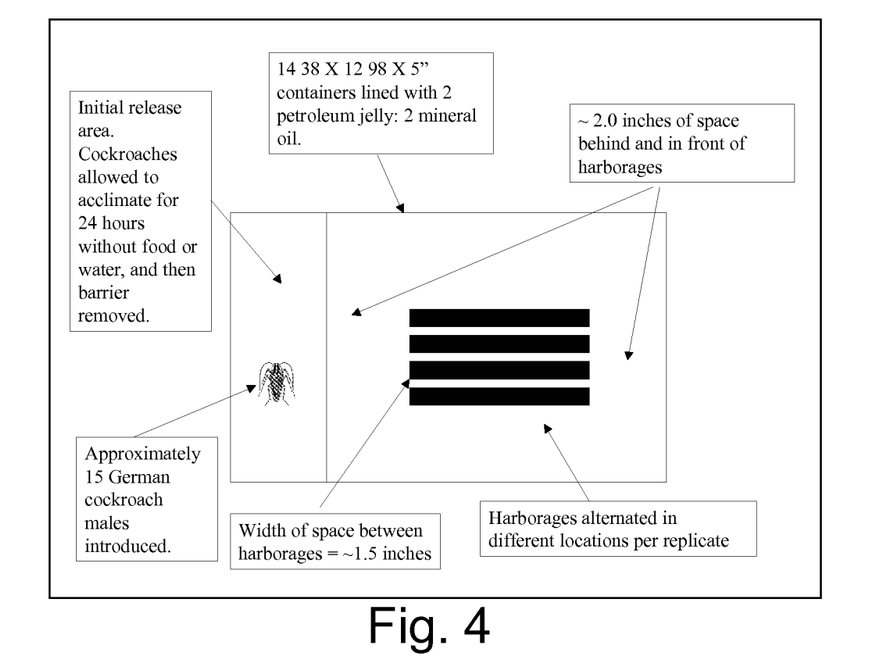
FIG. 4 displays the basic setup of the behavioural tests used to assess the efficacy of the apparatus of the invention.

Adult male German cockroaches, *Blattella germanica*, were evaluated to determine attraction to water-containing harbourages. To this end, they were given a choice of harbourages. Attraction was measured by comparing the location of the cockroaches in the following combination of harbourages per container or "arena", set up as depicted in FIG. 4:

(A) One fipronil-treated harbourage with a water source versus three untreated harbourages without a water source;

(B) one fipronil-treated harbourage without a water source versus three untreated harbourages without a water source; and (C) four untreated harbourages without a water source as a control.

Each measurement was performed in triplicate, with 15 cockroaches per run.

The design of the measurement is as shown in FIG. 4. As in the previous example, each run was conducted in a separate container (2.2×21.1×6.8 cm$^3$ mark-it-fresh container) whose top interior edge was lined with cockroach grease (2 petroleum jelly:3 mineral oil) to prevent cockroaches from escaping.

Measures were taken to provide for the acclimation of the insects to their new environment. After introduction into the arena, the cockroaches were held with an aluminium foil barrier in front of the test arena for 24 hours without food or water to allow for acclimation. After 24 hours, the barrier was removed and the cockroaches were offered the harbourages as described above. Without wishing to be bound by theory, it is assumed that this phase of acclimation will eliminate effects of pheromone communication between the cockroaches which was otherwise found capable of influencing the cockroaches' exploring behaviour and hence distorting the results obtained during the first twenty-four hours after the beginning of the trial.

For the duration of the test, no food was offered.

Attraction was measured by comparing the location of the cockroaches in fipronil-treated harbourages with or without water to untreated harbourages without water. Test arenas containing fipronil-treated harbourages with a water source were expected to cause higher mortality than arenas containing treated harbourages without a water source, since water is an attractant for cockroaches.

Results are shown in Table 1 and Table 2 below.

Table 1. Efficacy of fipronil-treated harbourages with and without a water source when adult male German cockroaches, *Blattella germanica*, were offered a choice of 1 test harbourage as listed versus 3 untreated harbourages without a water source. Means separated by Tukey's procedure performed on transformed data (Y'=arc-sin($\sqrt{y}$) for 1 DAT). Means indicated with the same letter (a), (b) do not differ significantly ($\alpha$=0.05).

| Test harbourage | Mean Mortality [%] at Day After Treatment (DAT) | | |
| --- | --- | --- | --- |
| | 1 DAT | 2 DAT | 4 DAT |
| Treated, with water source (A) | 48.9 (a) | 91.1 (a) | 100 (a) |
| Treated, without water source (B) | 22.2 (a) | 80.0 (a) | 100 (a) |
| Untreated, without water source (C) | 2.6 (b) | 7.1 (b) | 18.5 (b) |

Table 2. Attraction of fipronil-treated harbourages with and without a water source when adult male German cockroaches, *Blattella germanica*, were offered a choice of one test harbourage as listed versus three untreated harbourages without a water source. Means separated by t-test. Means indicated with the same letter (a), (b) do not differ significantly ($\alpha$=0.05).

| Test harbourage | Mean Location [%] in the test harbourage at Minutes After Treatment (MAT) | | | |
| --- | --- | --- | --- | --- |
| | 30 MAT | 60 MAT | 120 MAT | 180 MAT |
| Treated, with water source (A) | 8.9 (a) | 22.2 (a) | 17.8 (a) | 31.1 (a) |
| Treated, without water source (B) | 4.4 (a) | 6.7 (a) | 8.9 (a) | 8.9 (b) |

These results indicate that
fipronil-treated harbourages with and without a water source are both efficacious against German cockroaches; and
the addition of a water source to a fipronil-treated harbourage is potentially attractive to cockroaches, resulting in slightly higher mortality at DAT 1 and 2 and a statistically significant increase in the preference of cockroaches at 180 MAT.

It is thus concluded that in real world situations harbourages with water could be potentially attractive to pests, especially when water is scarce. It is expected that over a

EXAMPLE 3

Cascade Effect of Mortality

Previous experiments showed that fipronil-treated harbourages with and without a water source attractant built into the harbourage were highly efficacious against German cockroaches (see above). Thus, experiments were conducted to evaluate the dose transfer potential of these fipronil-treated harbourages by exposing untreated male German cockroaches, *Blattella germanica*, to the dead adult males obtained in the previous Example.

The design of the experiment was basically as shown in FIG. 4. Each test was conducted in a separate container (2.2× 21.1×6.8 cm$^3$ mark-it-fresh container) whose top interior edge was lined with cockroach grease (2 petroleum jelly:3 mineral oil) to prevent cockroaches from escaping. Per run, 10 untreated male German cockroaches ("recipient" cockroaches) were exposed to 10 dead male German cockroaches ("donor" cockroaches) retrieved from the treated harbourages (A or B) of the previous Example. Moribundity was evaluated at days 1, 2, 4 and 5 after treatment. No untreated controls were included.

All tests were performed in triplicate, under laboratory conditions in full laboratory light. The cockroaches were provided with a water source, but not a food source in order to encourage necrophagy.

Results are shown in Table 3 below.

Table 3. Dose transfer potential from fipronil-treated harbourages with and without water to untreated adult male cockroaches (recipient cockroaches), *Blattella germanica*. Each mean is based on a total of approximately 30 recipient cockroaches. Means were compared using a two-sample t-test. Means indicated with the same letter (a), (b) do not differ significantly ($\alpha=0.05$).

| Corpses retrieved from treated harbourages | Mean percentage of moribund cockroaches at Day After Treatment (DAT) | | | |
|---|---|---|---|---|
| | 1 DAT | 2 DAT | 4 DAT | 5 DAT |
| with water (A) | 4.0 (a) | 58.0 (b) | 98.0 (a) | 100.0 (a) |
| without water (B) | 14.0 (a) | 96.0 (a) | 98.0 (a) | 100.0 (a) |

Dead cockroaches exposed to fipronil-treated harbourages caused 98% mortality of their untreated counterparts at 4 DAT and 100% at 5 DAT.

These findings demonstrate that a cascade effect of mortality takes place, whereby also pests that have never entered the harbourages will be killed. This suggests that the invention cannot be thwarted by development of behavioural resistance, and will also be effective against socially organized pests.

This transfer or cascade effect could not occur if the "donor" cockroaches that acquired a lethal dose from visiting a treated harbourage had died or were trapped within the treated harbourage.

The invention claimed is:

1. An apparatus for pest control comprising
    a hollow station forming at least one entrance for the pests to be controlled and a harbourage area inside the station;
    a reservoir containing water and configured to provide access to water from the inside of said hollow station; and
    a contact pesticide for the pests to be controlled, said contact pesticide being provided inside said hollow station in such a way that pests which enter the hollow station through said at least one entrance to come to the reservoir for water or the harbourage area come into contact with said contact pesticide, wherein the apparatus is configured to prevent the free flow of water from the reservoir to the harbourage area, wherein the reservoir for water comprises a container for accommodating water, said container comprising at least one opening which is connected to at least one opening of said hollow station and wherein the at least one opening of said container and the at least one opening of said hollow station are plugged by an absorbent material forming an absorbent plug.

2. The apparatus of claim 1, wherein said apparatus does not comprise an edible attractant.

3. The apparatus of claim 1, wherein a surface of said absorbent plug is flush with an interior wall of said hollow station.

4. The apparatus of claim 1, wherein said container is arranged above said hollow station.

5. The apparatus of claim 1, wherein said container comprises a valve for recharging with water.

6. The apparatus of claim 1, wherein the reservoir for water can be recharged with water without dismantling the apparatus.

7. The apparatus of claim 1, wherein said apparatus comprises a means for fixing the apparatus on an external surface.

8. The apparatus of claim 1, wherein said hollow station comprises two entrances for the pests to be controlled arranged on opposite sides of the harbourage area.

9. The apparatus of claim 1, wherein said hollow station comprises at least one translucent section for inspection.

10. The apparatus of claim 9, wherein the at least one translucent section of said hollow station is coloured in red, orange or yellow.

11. The apparatus of claim 1, wherein said reservoir for water comprises at least one translucent section for inspection.

12. The apparatus of claim 11, wherein the at least one translucent section of said reservoir for water is coloured in blue.

13. The apparatus of claim 1, wherein the contact pesticide is fipronil.

14. A method for controlling pests comprising placing the apparatus of claim 1 in the area where the pest population is to be controlled.

15. The method according to claim 14, wherein the nature and availability of the contact pesticide are selected so that during the expected stay of a target pest within the apparatus said pest is exposed to a dosage of the pesticide that is sufficient for doing the intended damage but insufficient to kill the pest while still within the apparatus.

16. An apparatus for pest control comprising
    a hollow station forming at least one entrance for the pests to be controlled and a harbourage area inside the station;
    a reservoir configured to provide access to water from the inside of said hollow station; and
    a contact pesticide for the pests to be controlled, said contact pesticide being provided inside said hollow station in such a way that pests which enter the hollow station through said at least one entrance to come to the reservoir for water or the harbourage area come into contact with said contact pesticide, wherein the apparatus is configured to prevent the free flow of water from the reservoir to the harbourage area;

wherein the contact pesticide is provided by a pesticide-containing matrix that recedes at the at least one entrance of the hollow station, wherein the reservoir for water comprises a container for accommodating water, said container comprising at least one opening which is connected to at least one opening of said hollow station and wherein the at least one opening of said container and the at least one opening of said hollow station are plugged by an absorbent material forming an absorbent plug.

17. The apparatus of claim 16, wherein the contact pesticide is fipronil.

18. An apparatus for pest control comprising
a hollow station forming at least one entrance for the pests to be controlled and a harbourage area inside the station area inside the station;
a reservoir containing water and configured to provide access to water from the inside of said hollow station; and
a contact pesticide for the pests to be controlled, said contact pesticide being provided inside said hollow station in such a way that pests which enter the hollow station through said at least one entrance to come to the reservoir for water or the harbourage area come into contact with said contact pesticide, wherein the apparatus is configured to prevent the free flow of water from the reservoir to the harbourage area;
wherein the water does not comprise the contact pesticide, wherein the reservoir for water comprises a container for accommodating water, said container comprising at least one opening which is connected to at least one opening of said hollow station and wherein the at least one opening of said container and the at least one opening of said hollow station are plugged by an absorbent material forming an absorbent plug.

19. An apparatus for pest control comprising
a hollow station forming at least one entrance for the pests to be controlled and a harbourage area inside the station;
a reservoir containing water and configured to provide access to water from the inside of said hollow station; and
a contact pesticide for the pests to be controlled, said contact pesticide being provided inside said hollow station in such a way that pests which enter the hollow station through said at least one entrance to come to the reservoir for water or the harbourage area come into contact with said contact pesticide, wherein the apparatus is configured to prevent the free flow of water from the reservoir to the harbourage area,
wherein the reservoir for water comprises a container for accommodating water, said container comprising at least one opening which is connected to at least one opening of said hollow station, and wherein said container comprises a valve for recharging with water.

20. An apparatus for pest control comprising
a hollow station forming at least one entrance for the pests to be controlled and a harbourage area inside the station;
a reservoir configured to provide access to water from the inside of said hollow station; and
a contact pesticide for the pests to be controlled, said contact pesticide being provided inside said hollow station in such a way that pests which enter the hollow station through said at least one entrance to come to the reservoir for water or the harbourage area come into contact with said contact pesticide, wherein the apparatus is configured to prevent the free flow of water from the reservoir to the harbourage area;
wherein the contact pesticide is provided by a pesticide-containing matrix that recedes at the at least one entrance of the hollow station, wherein the reservoir for water comprises a container for accommodating water, said container comprising at least one opening which is connected to at least one opening of said hollow station, and wherein said container comprises a valve for recharging with water.

* * * * *